United States Patent
Andoh et al.

(10) Patent No.: US 6,750,308 B2
(45) Date of Patent: Jun. 15, 2004

(54) SILICONE RESIN COMPOSITIONS AND MOLDED PRODUCTS OF SILICONE RESINS

(75) Inventors: Hideki Andoh, Chiba (JP); Masayoshi Isozaki, Chiba (JP); Takero Teramoto, Tokyo (JP)

(73) Assignee: Nippon Steel Chemical Co., Ltd., Tokyo (JP)

(*) Notice: Subject to any disclaimer, the term of this patent is extended or adjusted under 35 U.S.C. 154(b) by 0 days.

(21) Appl. No.: 10/284,206

(22) Filed: Oct. 31, 2002

(65) Prior Publication Data

US 2003/0105246 A1 Jun. 5, 2003

(30) Foreign Application Priority Data

Nov. 5, 2001 (JP) ........................ 2001-339611

(51) Int. Cl.$^7$ .................... C08G 77/14; C08G 77/20
(52) U.S. Cl. ................... 528/26; 528/12; 528/25; 528/32; 528/37; 528/41; 525/474; 525/479
(58) Field of Search ................ 525/474, 479; 528/12, 25, 26, 32, 37, 41

(56) References Cited

U.S. PATENT DOCUMENTS

| | | | | |
|---|---|---|---|---|
| 5,939,576 A | * | 8/1999 | Lichtenhan et al. | 556/460 |
| 5,942,638 A | * | 8/1999 | Lichtenhan et al. | 556/460 |
| 6,284,858 B1 | | 9/2001 | Fujiyama et al. | 528/12 |
| 6,586,548 B2 | * | 7/2003 | Bonafini et al. | 526/279 |
| 2003/0050408 A1 | * | 3/2003 | Puhala et al. | 525/479 |
| 2003/0055193 A1 | * | 3/2003 | Lichtenhan et al. | 528/10 |

FOREIGN PATENT DOCUMENTS

| EP | 0 516 144 A1 | 5/1991 |
|---|---|---|
| JP | 50-139900 | 11/1975 |
| JP | 07-070321 | 3/1995 |

OTHER PUBLICATIONS

Sellinger et al. "Silsesquioxanes as Synthetic Platforms. Thermally Curable and Photocurable Inorganic/Organic Hybrids", Macromolecules 1996, 29, 2327–2330.*
Zhang et al. "Hydrosilation of Allyl Alcohol with [HSiMe2OSiO1.5]8: Octa(3–hydroxypropyldimethylsiloxy)ocatsilsesquioxane an Its Octamethacrylate Derivative as Potential Precursors to Hybrid Nanocomposites" J. Am. Chem. Soc. 2000, 122, 6979–6988.*

* cited by examiner

Primary Examiner—Jeffrey B. Robertson
(74) Attorney, Agent, or Firm—Rader, Fishman & Grauer PLLC

(57) ABSTRACT

This invention relates to a silicone resin composition comprising a silicone resin and an unsaturated compound. This resin composition is formulated from a silicone resin which has in its structural unit cage type polyorganosilsesquioxane whose siloxy groups are linked to a triorganosilyl group represented by —Si(CH$_3$)$_2$—X (wherein X is —R$^1$—OCO—CR$^2$=CH$_2$, —R$^1$—CR$^2$=CH$_2$ or —CH=CH$_2$, R$^1$ is an alkyl group, an alkylidene group or phenylene group and R$^2$ is a hydrogen atom or an alkyl group) and an unsaturated compound which contains an unsaturated group represented by —R$^3$—CR$^4$=CH$_2$ or —CR$^4$=CH$_2$ (wherein R$^3$ is an alkylene group, an alkylidene group or —OCO— group and R$^4$ is a hydrogen atom or an alkyl group) at the weight ratio of the silicone resin to the unsaturated compound in the range of 1:99 to 99:1. The copolymer to be obtained from this silicone resin composition shows such excellent heat resistance and light transmission as to be capable of substituting for glass, low water absorption, high dimensional stability and good moldability.

13 Claims, No Drawings

SILICONE RESIN COMPOSITIONS AND MOLDED PRODUCTS OF SILICONE RESINS

FIELD OF TECHNOLOGY OF THE INVENTION

This invention relates to silicone resin compositions and to molded products of silicone resin that are tridimensionally crosslinked products of said silicone resin compositions. Silicone resin compositions yield transparent materials which are lightweight and highly impact-resistant and are suitable for optical applications such as lenses, optical disks, optical fibers and bases for flat panel displays and for window materials for automobiles and houses.

BACKGROUND TECHNOLOGY

Among heat-curable plastics, silicone resins show excellent resistance to heat, weather and water and possess high potentialities of becoming substitutes for inorganic glasses. In particular, polyorganosilsesquioxanes of a ladder structure are known to be comparable to polyimides in heat resistance.

Examples of polyorganosilsesquioxanes include cage-type octaphenylsilsesquioxane prepared by hydrolyzing phenyltrichlorosilane in an organic solvent to phenyltrihydroxysilane and heating the phenyltrihydroxysilane in a water-free solvent in the presence of an alkaline rearrangement and condensation catalyst to effect polycondensation, phenylsilsesquioxane prepolymers of low intrinsic viscosity prepared by separating said cage-type octaphenylsilsesquioxane and polymerizing it again under heat in the presence of an alkaline rearrangement and condensation catalyst and phenylsilsesquioxane polymers of high intrinsic viscosity prepared by polymerizing the prepolymers again in the presence of an alkaline rearrangement and condensation catalyst and the processes for preparing them are disclosed in JP40-15989 B, JP50-139900 A and J. Polymer Sci. Part C, No. 1, pp. 83–97 (1963).

However, the siloxane linkage in silicone resins including the aforementioned polyorganosilsesquioxanes is highly flexible and, in order for silicone resins to manifest the modulus of elasticity required for structures, the crosslinking density of silicone resins must be increased. Now, an increase in crosslinking density causes a marked increase in curing shrinkage which undesirably renders the molded product brittle. Moreover, the residual stress increases as a result of curing shrinkage and this makes it extremely difficult to mold thick-walled products. For these reasons, silicone resins of high crosslinking density are limited to coatings in their applications and, under existing conditions, it is only silicone rubbers of low crosslinking density that are used for molding applications.

In order to solve the aforementioned problems, copolymerization of silicone resins with acrylic resins of good molding proccessability is proposed. For example, in the case of nonladder-type silicone resins, a technique for copolymerizing an acrylic polymer having alkoxysilyl side chains and an alkoxysilane to form a hybrid composed of an acrylic polymer as organic constituent and polysiloxane as inorganic constituent is disclosed in the Journal of the Chemical Society of Japan, 571–580 (1998). Silicone resins, however, are intrinsically not sufficiently compatible with acrylic resins and there are many cases where optical properties such as light transmission are adversely affected even when the mechanical strength presents no problem.

In order to solve the aforementioned problems in the case of ladder-type silicone resins, polyorganosilsesequioxanes to which reactive functional groups have been introduced as part of side chains are known for the purpose of copolymerizing them with organic compounds having reactive functional groups. Moreover, polyorganosilsesquioxanes in which the hydrogen atoms of the silanol groups are wholly or partly replaced by triorganosily groups are disclosed in EP0516144A1 and elsewhere and the preparation of most of such ladder-type polyorganosilsesquioxanes has a primary objective of improving storage stability by deactivating the terminal silanol groups or controlling the molecular weight of polyorganosilsesquioxanes by adding a silylating agent to terminate the polycondensation of polyorganosilsesquioxanes, that is, a primary objective of end capping.

The end capping is effected in a number of ways as follows: polyorganosilsesquioxane containing the unreacted silanol groups is first synthesized and then treated with a triorganochlorosilane in the presence of an alkaline catalyst such as pyridine to effect dehydrochlorination; similarly, polyorganosilsesquioxane containing silanol groups is treated with a triorganoisocyanatosilane; polyorganosilsesquioxane containing terminal hydroxyl groups is synthesized purposefully and treated with a triorganoalkoxysilane to effect dealkanolation or with a triorganomonochlorosilane to effect dehydrochlorination; hydroxyl-terminated polyorganosilsesquioxane is treated with disilazane. A method for trimethylsilylation based on the reaction of the terminal silanol or alkoxy group of methylsilsesquioxane with hexamethylsilane in the presence of an acid catalyst is described in JP7-70321 A.

As noted above, a variety of methods are known for introducing reactive functional groups as side chain or terminal group to ladder-type polyorganosilsesquioxane and almost all of these methods are based on the prior synthesis of ladder-type polyorganosilsesquioxane having side-chain or terminal hydroxyl groups (silanol groups) followed by the reaction of the hydroxyl groups with compounds containing reactive functional groups such as chlorosilanes, alkoxysilanes, isocyanatosilanes and disilazanes.

However, these ladder-type polyorganosilsesquioxanes, like the aforementioned nonladder-type silicone resins, are poorly compatible with acrylic resins or other organic compounds containing functional groups and, in case the two are copolymerized, deterioration of transparency occurs as a result of phase separation. Consequently, it is difficult to substitute products molded from compositions of the aforementioned polyorganosilsesquioxanes for inorganic glasses. Moreover, the synthesized polyorganosilsesquioxanes contain in their structure a small amount of silanol groups that made no contribution to the polymerization as defect or branched structure and this involves the problems of deterioration of mechanical and heat-resistant properties and loss of storage stability.

It is to be noted that the present applicant has proposed cage-type or ladder-type polyorganosilsesquioxanes containing reactive functional groups and a process for preparing the same in WO98/41566 (U.S. Pat. No. 6,284,858 B1).

DISCLOSURE OF THE INVENTION

Accordingly, an object of this invention is to provide a silicone resin composition which is capable of yielding a silicone resin copolymer of excellent transparency. Another object of this invention is to provide a silicone resin composition comprising a silicone resin and an unsaturated compound which is compatible and copolymerizable with the silicone resin. Still another object of this invention is to provide a silicone resin composition which contains no silanol groups as defect and branched structure and shows good storage stability. A further object of this invention is to provide a silicone resin copolymer which shows excellent heat resistance, transparency, water resistance and mechanical properties and is suitable for use as a substitute for inorganic glass and to provide a molded product thereof. A still further object of this invention is to provide a tridimensionally crosslinked silicone resin copolymer and a molded product thereof.

The silicone resin composition of this invention is formulated from a silicone resin comprising mainly polyorganosilsesquioxane which is represented by formula (1)

$$[RSiO_{3/2}]_n \tag{1}$$

(wherein R is an alkyl group containing 1 to 6 carbon atoms or phenyl group) and contains a cage structure in its structural unit and the siloxy (SiO—) groups of which are at least partly linked to a triorganosilyl group represented by the following general formula (2)

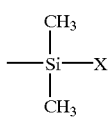
$$\tag{2}$$

(wherein X is a reactive functional group represented by a) —R$^1$—OCO—CR$^2$=CH$_2$, b) —R$^1$—CR$^2$=CH$_2$ or c) —CH=CH$_2$, R$^1$ is an alkylene group, an alkylidene group or phenylene group and R$^2$ is a hydrogen atom or an alkyl group) and an unsaturated compound which contains at least one unsaturated group represented by —R$^3$—CR$^4$=CH$_2$ or —CR$^4$=CH$_2$ (wherein R$^3$ is an alkylene group, an alkylidene group or —OCO— group and R$^4$ is a hydrogen atom or an alkyl group) in the molecule and is radically copolymerizable with the silicone resin at a weight ratio of the silicone resin to the radically copolymerizable unsaturated compound of 1:99 to 99:1.

The process for preparing the silicone resin copolymer of this invention is based on radical copolymerization of the silicone resin composition to be effected by heating or by irradiation with energetic radiation. Moreover, the silicone resin copolymer of this invention or the molded product thereof can be obtained by radical copolymerization of the silicone resin composition. Here, the aforementioned silicone resin copolymer or the molded product thereof preferably shows a glass transition temperature and a 5% weight loss temperature, respectively of 300° C. or above, a total light transmission of 85% or more and a water absorption (JIS K7209) of 1.5 wt % or less.

DETAILED DESCRIPTION

This invention will be described concretely below.

The silicone resin composition of this invention comprises a silicone resin and an unsaturated compound which is copolymerizable with the silicone resin as main components. The silicone resin copolymer of this invention is obtained by radically copolymerizing the silicone resin composition. The molded product of this invention is obtained by molding the silicone resin composition followed by curing or by molding the silicone resin copolymer. The silicone resin copolymer of this invention is preferably a crosslinked polymer and it can be molded and cured by the same technique as used for heat-curable resins.

Silicone resins useful for this invention comprise cage-structured polyorganosilsesquioxanes (or cage-type polyorganosilsesquioxanes) having terminal reactive functional groups. As noted above, the conventional silicone resins, regardless of whether they are ladder-type or nonladder-type, exhibit poor compatibility with organic compounds containing functional groups such as acrylic resins and it was not possible to obtain transparent molded products from compositions comprising these two. In the silicone resin of this invention, however, substituents such as an alkyl group and phenyl group showing good compatibility with organic compounds protrude out of the cage while the siloxane skeleton showing poor compatibility with organic compounds is held inside the cage; thus the silicone resin seemingly forms a micelle structure and can be mixed with an unsaturated compound such as acrylic monomer and oligomer at an optional ratio.

The silicone resin to be used in this invention has a structure in which the SiO groups located at the end of the molecular chain of polyorganosilsesquioxane are at least partly linked to reactive functional group X represented by the aforementioned general formula (2) and normally shows Mw (which is the weight average molecular weight determined by GPC with polystyrene used as the standard in calibration) of 800–100,000, preferably 800–5,000.

Group X in general formula (2) is the reactive functional group represented by the aforementioned a) to c) while the symbol n in general formula (1) is the number of repeating units and its mean can be calculated readily from Mw.

The concrete structural formulas of the silicone resins include the cage structure represented by structural formula (5), the ladder structure cage-terminated at one end represented by structural formula (6) and the ladder structure represented by structural formula (7). Structure (5) or (6) or both are essential, accounting for 50% or more, preferably 70% or more, and the proportion of structure (7) is preferably less than 50%. In each structural formula, a part of Y, preferably 50% or more, more preferably 90–100%, is the triorganosilyl group represented by general formula (2). In the following description of the silicone resin to be used in this invention, octaphenylsilsesquioxane is taken as an example of polyorganosilsesquioxane on occasion, but this invention is not limited thereto. Moreover, the cage-type polyorganosilsesquioxane means the one containing a cage structure in the molecule as shown by structural formula (5) or (6).

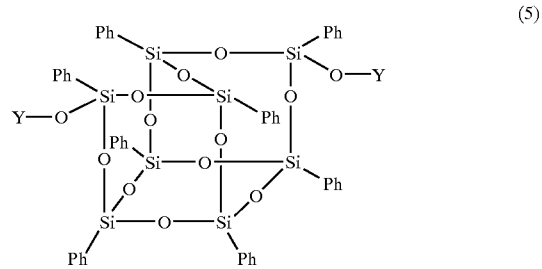
(5)

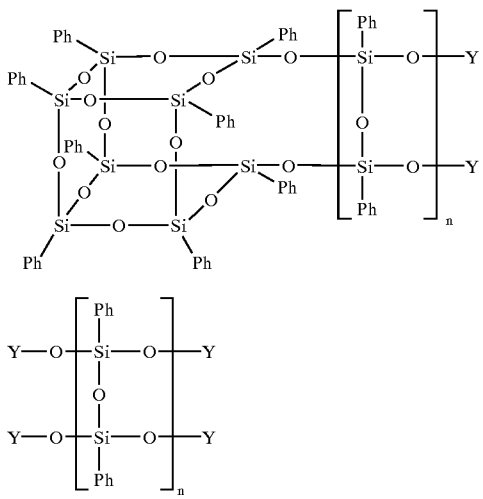

(In each of structural formulas (5) to (7), at least a part of Y is the triorganosilyl group represented by general formula (2) and n is the number of repeating units.)

The cage-type octaphenylsilsesquioxane prepared as described in the aforementioned JP40-15989 B or WO98/41566 by hydrolyzing phenyltrichlorosilane in an organic solvent to pheyltrihydroxysilane and polycondensing the phenyltrihydroxysilane under heat in the presence of an alkaline rearrangement and condensation catalyst can be used suitably as cage-type polyorganosilsesquioxane which is cage-terminated and free of silanol groups.

The silicone resin to be used in this invention can be obtained by the procedure described in WO98/41566. For example, the aforementioned cage-type polyorganosilsesquioxane or polyorganosilsesquioxane containing the foregoing is treated with a disiloxane represented by general formula (4).

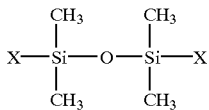

Reactive functional group X in general formulas (2) and (4) is any one of a) —$R^1$—OCO—$CR^2$=$CH_2$, b) —$R^1$—$CR^2$=$CH_2$ and c) —CH=$CH_2$. In each formula, $R^1$ is an alkylene group, an alkylidene group or phenylene group, preferably a lower alkylene or alkylidene group containing 1 to 6 carbon atoms or phenylene group while $R^2$ is a hydrogen atom or an alkyl group, preferably a hydrogen atom or a lower alkyl group containing 1 to 6 carbon atoms.

The disiloxane represented by general formula (4) wherein X is —$C_3H_6$—OCO—$C(CH_3)$=$CH_2$ or X corresponds to the aforementioned a) can be prepared, for example, by performing hydrosilylation of dimethylchlorosilane and allyl (meth)acrylate in the presence of chloroplatinic acid as a catalyst followed by hydrolysis and polycondensation.

The alkaline rearrangement and condensation catalysts useful for the reaction of polyorganosilsesquioxane with the aforementioned disiloxane include alkali metal hydroxides such as cesium hydroxide, potassium hydroxide, sodium hydroxide and rubidium hydroxide, ammonium hydroxides such as tetramethylammonium hydroxide, tetraethylammonium hydroxide, benzyltrimethylammonium hydroxide and benzyltriethylammonium hydroxide and tetraorganophosphonium compounds such as tetrabutylphosphonium hydroxide and tetraethylphosphonium hydroxide. Alkali metal hydroxides are preferred and, in particular, cesium hydroxide is used for its high reactivity. The catalyst in question is added preferably in an amount corresponding to 0.01–20 wt % of the raw material disiloxane.

The organic solvents useful for the aforementioned reaction include benzene, toluene, xylene, ethylene glycol dimethyl ether, N-methyl-2-pyrrolidinone, o-dichlorobenzene, diphenyl ether, 1,4-dioxane, acetone, methyl ethyl ketone, methyl isobutyl ketone, ethyl acetate, butyl acetate, ethyl acetoacetate, ethylene glycol monomethyl ether, propylene glycol monomethyl ether, cyclohexane, benzonitrile, methyl phenyl ether, mesitylene, durene, m-dimethoxybenzene, biphenyl, chlorobiphenyl and chlorobenzene. It is preferable to select a nonpolar solvent such as benzene, toluene and xylene.

The equilibrium reaction of the aforementioned polyorganosilsesquioxane with a disiloxane in the presence of an alkaline catalyst competes with ring opening or polymerization of cage-type polyorganosilsesquioxane alone and it is necessary to cause the former to proceed in preference to the latter. This reaction being fundamentally an equilibrium reaction, the weight average molecular weight Mw, yield and rate of formation of polyorganosilsesquioxane having terminal reactive functional groups are spontaneously decided by factors such as reaction temperature, reaction time, ratio of the two reactants to be added and amount of alkaline catalyst and the reaction is preferably carried out under the following conditions.

The weight of cage-type polyorganosilsesquioxane (A) to be added and that of disiloxane (B) to be added are so chosen as to satisfy the relationship $0.01 \leq B/A \leq 100$, preferably $0.01 \leq B/A \leq 10$.

In the aforementioned equilibrium reaction, the solubility of the alkaline catalyst in the siloxane linkage tends to increase and the reaction rate and the yield tend to increase as the reaction temperature is set at a higher level, but conversely the reaction selectivity tends to decrease as the difference between disiloxane and cage-type polyorganosilsesquioxane in the reactivity toward the alkaline catalyst decreases. That is, what is induced here is a side reaction which is polymerization of cage-type polyorganosilsesquioxane alone. Therefore, the reaction temperature is preferably set in the range of 60–200° C., preferably 100–150° C. The reaction time varies somewhat with the reaction temperature and agitation efficiency, but it is preferably 1–72 hours at a temperature in the aforementioned range in order to attain sufficiently the object equilibrium reaction.

The silicone resin to be used in this invention is not limited to the one obtained by the aforementioned method and any silicone resin can be used if it comprises mainly cage-type polyorganosilsesquioxane in its structural unit and the siloxy (SiO—) groups of the polyorganosilsesquioxane at least partly contain the reactive functional groups represented by general formula (2). The number of the reactive functional groups per molecule is preferably 1 to 4 and, in order to obtain crosslinked copolymers, the number per molecule is 1.1 or more, preferably 1.2 to 4. Moreover, the silicone resin of this invention shows good compatibility with many organic compounds and can be mixed with unsaturated compounds such as acrylates, methacrylates, allylic compounds and vinyl compounds at an optional ratio to form a homogeneous composition.

In the silicone resin composition of this invention, the unsaturated compound to be used together with the silicone resin contains at least one unsaturated group represented by —R³—CR⁴=CH₂ or —CR⁴=CH₂ in the molecule and is radically copolymerizable with the aforementioned silicone resin. Here, R³ is an alkylene group, an alkylidene group or —OCO— group and, preferably, the alkylene or alkylidene group is a lower alkylene or alkylidene group containing 1 to 6 carbon atoms; R⁴ is a hydrogen atom or an alkyl group, preferably, hydrogen or methyl. A preferred unsaturated group is at least one kind selected from the group of acryloyl, methacryloyl, allyl and vinyl.

The silicone resin composition of this invention comprises mainly A) silicone resin and B) unsaturated compound which contains an unsaturated group and is copolymerizable with the silicone resin. The weight ratio of the two is in the range of 1:99 to 99:1 and the ratio of the amount of the silicone resin (A) to that of the unsaturated compound (B) satisfies the relationship preferably 10/90≦A/B≦80/20, more preferably 20/80≦A/B≦50/50. A ratio of less than 10% is undesirable as the molded product after curing suffers deterioration in properties such as heat resistance, transparency and water absorption. Likewise, a ratio in excess of 80% is undesirable as the composition increases in viscosity on account of the silicone resin itself being solid and becomes difficult to mold.

In the silicone resin composition of this invention, the unsaturated compound to be used together with the silicone resin contains 10–100 wt %, preferably 20–80 wt %, of the alicyclic unsaturated compound represented by the general formula (3). Furthermore, the unsaturated compound should advantageously contain the alicyclic compound together with other unsaturated compounds, preferably non-alicyclic. Preferred as such non-alicyclic compounds are chain unsaturated compounds and aromatic unsaturated compounds. The unsaturated compound here may be wholly the alicyclic unsaturated compound represented by the general formula (3), but it preferably contains a non-alicyclic unsaturated compound. Where the alicyclic unsaturated compound is used, the mix weight ratio of (silicone resin):(non-alicyclic unsaturated compound):(alicyclic unsaturated compound) is (5–80):(0–80):(10–50), preferably (10–60):(10–70): (10–50). A composition containing higher proportion of the silicone resin yields a copolymer which shows dominantly the properties of the silicone resin with improvement of some of its defects. On the other hand, a composition containing a higher proportion of the unsaturated compound yields a copolymer which shows dominantly the properties of the resin from the unsaturated compound with improvement of some of its defects.

The aforementioned alicyclic unsaturated compound is represented by general formula (3)

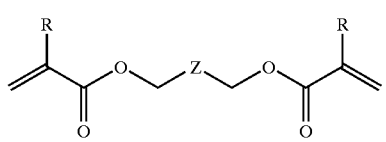

(3)

(wherein Z is represented by (3a) or (3b) shown below and R is a hydrogen atom or methyl group).

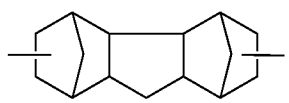

(3a)

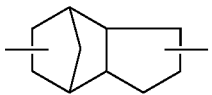

(3b)

A concrete example of the alicyclic unsaturated compound in which Z is (3a) and R is hydrogen is pentacyclo [6.5.1³,⁶.0²,⁷.0⁹,¹³]pentadecane diacrylate. Likewise, a concrete example where Z is (3b) and R is hydrogen is tetrahydro dicyclopentan-diyl diacrylate (or tricyclo [5.2.1.0²,⁶]decane diacrylate).

The unsaturated compounds are divided roughly into reactive oligomers having 2 to 20 repeating structural units and reactive monomers having low molecular weight and exhibiting low viscosity. They are also divided roughly into monofunctional unsaturated compounds containing one unsaturated group and polyfunctional unsaturated compounds containing two or more unsaturated groups. In order to obtain a good tridimensionally crosslinked product, the presence of an extremely small amount (1 wt % or less) of polyfunctional unsaturated compounds is beneficial. In the case where good heat resistance and high strength are anticipated for the copolymer, the number of unsaturated groups per molecule on the average is 1.1 or more, preferably 1.5 or more, more preferably 1.6–5. For this purpose, the average number of functional groups is controlled by using a mixture of monofunctional unsaturated compounds and polyfunctional unsaturated compounds containing 2 to 5 unsaturated groups.

Examples of the reactive oligomers are epoxy acrylates, epoxidized oil acrylates, urethane acrylates, unsaturated polyesters, polyester acrylates, polyether acrylates, vinyl acrylates, polyene/thiol, silicone acrylates, polybutadiene and poly(styrylethyl methacrylate). They occur as monofunctional unsaturated compounds and polyfunctional unsaturated compounds.

Examples of the reactive monofunctional monomers include styrene, vinyl acetate, N-vinylpyrrolidone, butyl acrylate, 2-ethylhexyl acrylate, n-hexyl acrylate, cyclohexyl acrylate, n-decyl acrylate, isobornyl acrylate, dicyclopentenyloxyethyl acrylate, phenoxyethyl acrylate and trifluoroethyl methacrylate.

Examples of the reactive polyfunctional monomers other than the unsaturated compounds represented by general formula (3) include tripropylene glycol diacrylate, 1,6-hexanediol diacrylate, bisphenol A diglycidyl ether diacrylate, tetraethylene glycol diacrylate, hydroxypivalic acid neopentyl glycol diacrylate, trimethylolpropane triacrylate, pentaerythritol triacrylate, pentaerythritol tetraacrylate and dipentaerythritol hexaacrylate.

A variety of reactive oligomers and monomers other than those exemplified above may be used as the unsaturated compound in this invention. These reactive oligomers and monomers may be used singly or as a mixture of two kinds or more.

However, where A) silicone resin, B) unsaturated compound and C) other unsaturated compound, monomer or oligomer are used, the ratio C/(B+C) is kept at 50 wt % or less, preferably 20 wt % or less.

The silicone resin composition of this invention is subjected to radical copolymerization to yield the silicone resin copolymer. For the purpose of improving the properties of the silicone resin copolymer or accelerating the radical copolymerization, a variety of additives may be incorporated in the silicone resin composition of this invention. The additives for accelerating the reaction include thermal polymerization initiators, thermal polymerization accelerators, photopolymerization initiators, photoinitiation auxiliaries and sensitizers. When a photopolymerization initiator or a thermal polymerization initiator is added, it is added in an amount of 0.1–5 parts by weight, preferably 0.1–3 parts by weight, per 100 parts by weight of the sum of the silicone resin and the unsaturated compound. Addition of less than 0.1 part by weight causes insufficient curing to yield a molded product of low strength and rigidity. On the other hand, addition in excess of 5 parts by weight causes the problem of coloration and the like of the molded product.

The thermal polymerization initiators to be used for the aforementioned purpose include a variety of organic peroxides such as ketone peroxides, peroxyketals, hydroperoxides, dialkyl peroxides, diacyl peroxides, peroxydicarbonates and peroxyesters. Concrete examples are cyclohexanone peroxide, 1,1-bis(t-hexaperoxy)cyclohexanone, cumene hydroperoxide, dicumyl peroxide, benzoyl peroxide, diisopropyl peroxydicarbonate and t-butylperoxy-2-ethylhexanoate.

It is possible to add to the aforementioned thermal polymerization initiator an accelerator to activate the polymerization reaction and examples of such accelerators are cobalt naphthenate, vanadium pentoxide, dimethylaniline and a quaternary ammonium salt. The amount to be added of such an accelerator is not specified and it is normally in the range of $\frac{1}{10}$ to 10 times the amount of the thermal polymerization initiator.

The photopolymerization initiators include acetophenones, benzoins, benzophenones, thioxanthones and acylphosphine oxides. Concrete examples are trichloroacetophenone, diethoxyacetophenone, 1-phenyl-2-hydroxy-2-methylpropan-1-one, 1-hydroxycyclohexyl phenyl ketone, 2-methyl-1-(4-methylthiophenyl)-2-morpholinopropan-1-one, benzoin methyl ether, benzyl dimethyl ketal, benzophenone, thioxanthone, 2,4,6-trimethylbenzoyldiphenylphosphine oxide, methylphenyl glyoxylate, camphorquinone, benzil, anthraquinone and Michler's ketone.

A photoinitiation auxiliary or a sensitizer which acts effectively in combination with the aforementioned photopolymerization initiator may be added to the silicone resin composition of this invention. A photoinitiation auxiliary itself is not activated by irradiation with UV, but accelerates the initiation reaction when used together with a photopolymerization initiator and helps the curing reaction to proceed efficiently and its examples include aliphatic amines such as triethanolamine and N-methyldiethanolamine and aromatic amines such as Michler's ketone and 4,4-diethylaminobenzophenone. A sensitizer undergoes excitation by absorbing the energetic radiation which the photopolymerization initiator does not absorb and transfers the absorbed energy to the photopolymerization initiator and its examples include thioxanthone, N-ethylmorpholine and metallic cobalt. The amount to be added of a photoinitiation auxiliary or a sensitizer is not specified and it is normally in the range of $\frac{1}{10}$ to 10 times the amount of the thermal polymerization initiator.

A variety of additives may be added to the silicone resin composition of this invention as long as such addition does not defeat the purpose of this invention. Such additives include organic/inorganic fillers, plasticizers, flame retardants, heat stabilizers, antioxidants, light stabilizers, UV absorbers, lubricants, antistatic agents, parting agents, foaming agents, nucleating agents, colorants, crosslinking agents, dispersing agents and resin components.

The resin components referred to above are exemplified by thermoplastic and heat-curable elastomers and rubbers to be added for the purpose of providing the molded product with impact resistance or the so-called impact modifiers. Concrete examples are low-density polyethylene, linear low-density polyethylene, ethylene-propylene rubbers, ethylene-propylene-diene copolymers, styrene-butadiene-styrene copolymers, styrene-isoprene-styrene copolymers, styrene-ethylene-butylene-styrene copolymers, acrylonitrile-butadiene rubbers and other elastomers and rubbers based on vinyl chloride polymers, urethanes, polyesters, polyamides and fluoropolymers.

Radical polymerization of the silicone resin composition of this invention gives the silicone resin copolymer. The silicone resin composition is molded into a given shape and then subjected to radical copolymerization to give a molded product of the silicone resin copolymer. In case the silicone resin copolymer is thermoplastic, a variety of molding techniques can be adopted. However, the copolymer assumes a tridimensionally crosslinked structure when the number of reactive substituents or unsaturated groups per molecule exceeds 1.0 and, in this case, the technique of molding and curing is normally adopted. For this reason, radical copolymerization is also called curing. Radical copolymerization is performed suitably by heating or by irradiation with energetic rays such as electron rays or ultraviolet rays.

When curing is performed by heating alone, the silicone resin composition is injected into the suitably shaped cavity of a mold, heated at 200–250° C. to effect generation of radicals, polymerization and curing, and removed from the mold to give a molded product of a given shape. In case the mold is not used, the silicone resin composition of this invention is applied to a moving steel belt by the use of a doctor blade or a roll coater and heated in an oven at 200–250° C. to give a molded product in sheet form.

When curing is performed by irradiation with electron rays, the silicone resin composition can be cured at a radiation dose of 1–50 Mrad by the use of an electron irradiation apparatus of such type as scanning, electron curtain and broad beam. As in the case of curing by heating, the composition is injected into the suitably shaped cavity of a mold constructed of a transparent material such as quartz glass, irradiated by electron rays in the aforementioned electron irradiation apparatus to effect curing and removed from the mold to give a molded product of a given shape. In case the mold is not used, the silicone resin composition of this invention is applied to a moving steel belt by the use of a doctor blade or a roll coater and cured in the aforementioned electron irradiation apparatus to give a molded product in sheet form.

On the other hand, the silicone resin copolymer of this invention can be prepared by curing the silicone resin composition containing a radical polymerization initiator by heating or by photoirradiation. In the preparation of the copolymer (molded product) by heating, the molding temperature can be selected from a wide range of temperatures from room temperature to approximately 200° C. by proper selection of a thermal polymerization initiator and an accelerator. Also in this case, the silicone resin composition can be molded into a desired shape by curing the composition in a mold or on a steel belt.

In the preparation of the copolymer (molded product) by photoirradiation, the silicone resin composition can be molded by irradiation with ultraviolet rays at the wavelength of 10–400 nm or with visible rays at the wavelength of 400–700 nm. The wavelength of the light to be used is not restricted, but near ultraviolet rays at the wavelength of 200–400 nm are used advantageously. Lamps for generating ultraviolet rays include low-pressure mercury lamps (output; 0.4–4 W/cm), high-pressure mercury lamps (40–160 W/cm), ultrahigh-pressure mercury lamps (173–435 W/cm), metal halide lamps (80–160 W/cm), pulsed xenon lamps (80–120 W/cm) and electrodeless discharge lamps (80–120 W/cm). Each of these lamps shows a characteristic spectral distribution and the selection of a lamp is dictated by the kind of photoinitiator to be used.

For example, the silicone resin copolymer (molded product) is prepared by photoirradiation as follows; the silicone resin composition is injected into the suitably shaped cavity of a mold constructed of a transparent material such as quartz glass, cured by irradiation with ultraviolet rays by the use of one of the aforementioned lamps and removed from the mold to give a molded product of a given shape. Or, in case the mold is not used, the silicone resin composition of this invention is applied to a moving steel belt by the use of a doctor blade or a roll coater and cured by irradiation with ultraviolet rays by the use of one of the aforementioned lamps to give a molded product in sheet form.

Curing is performed in the absence of the mold in some of the aforementioned methods for preparing the silicone resin copolymers; in this case, the curing is affected by the polymerization-inhibiting action of oxygen in air and the surface of the molded product may sometimes remain uncured. In order to mitigate the adverse effect of oxygen, curing may be performed in an atmosphere of nitrogen or in vacuum or a cover sheet or a liquid sheet may be placed on the surface of the silicone resin composition during curing. This invention comprises these procedures.

The silicone resin copolymer (molded product) of this invention thus obtained shows a glass transition temperature of 300° C. or above as determined by a dynamic thermomechanical analyzer (DMA) or by a thermomechanical analyzer (TMA), a 5% weight loss temperature of 300° C. or above as determined by a thermogravimetric analyzer (TGA) and a total light transmission of 85% or more; furthermore, its water absorption can be controlled at 1.5% or less, advantageously at 1.0% or less, as determined in accordance with JIS K7209. In consequence, because of its high heat resistance, high transparency and good dimensional stability, the silicone resin copolymer can be used in a variety of applications as a substitute for glass.

EXAMPLES

This invention is described below with reference to the examples. The silicone resins used in the examples are those which have been prepared in the synthetic examples.

Synthetic Example 1

In 500 cc of benzene was dissolved 105 g (0.5 mole) of phenyltrichlorosilane and the solution was shaken with water until the hydrolysis was complete. The hydrolysis product was washed with water, 16.6 cc (0.03 mole) of a commercial 30% solution of benzyltrimethylammonium hydroxide was added to the hydrolysis product and the mixture was heated at reflux temperature for 4 hours. The whole was cooled and left standing for about 96 hours. After this time had elapsed, the resulting slurry was heated again at reflux temperature for 24 hours, then cooled and filtered to give about 75 g of cage-type octaphenylsilsesquioxane.

In a reaction vessel were introduced 8 parts by weight of the aforementioned cage-type octaphenylsilsesquioxane, 8 parts by weight of 1,3-bis(3-methacryloyloxypropyl)-1,1,3,3-tetramethyldisiloxane, 32 parts by weight of toluene, 0.16 part by weight of cesium hydroxide and 0.03 part by weight of a polymerization inhibitor (Methoquinone, available from Seiko Chemical Co., Ltd.) and the mixture was heated at reflux temperature for 7 hours with vigorous stirring. The cage-type octaphenylsilsesquioxane in white powder did not dissolve in the toluene at the time of introduction, but it gradually dissolved as the reaction progressed and dissolved wholly after 7 hours. The mixture was cooled to room temperature, the insoluble unreacted cesium hydroxide was filtered off and 500 parts by weight of methanol was poured to the filtrate to precipitate silylated polyphenylsilsesquioxane containing terminal methacryloyl groups. The precipitate was filtered and dried in vacuum to give 14 parts by weight of cage-type silylated polyphenylsilsesquioxane containing terminal methacryloyl groups (silicone resin C) as a white solid.

The Mw of silicone resin C was approximately 1,500. When the resin was analyzed by infrared spectrometry using the KBr tablet method, absorption bands assignable to Si—$C_6H_5$ were observed at 1595 $cm^{-1}$ and 1430 $cm^{-1}$ and those assignable to the antisymmetric stretching vibration of Si—O—Si at 1135 $c^{-1}$ and 1020 $cm^{-1}$ and said oligomer was found to have mostly a cage structure and a little of a ladder structure. Moreover, the absorption band assignable to Si—OH was not observed at 3400 $cm^{-1}$. The signals of the H and C nuclei in the 3-methacryloyloxypropyldimethylsilyl group and phenyl group were observed in $^1$H-NMR and $^{13}$C-MASNMR measurements. In a $^{29}$Si-NASNMR measurement, the signals of the Si nucleus in the 3-methacryloyloxypropyldimethylsilyl group and the Si nuclei in the cage-type octaphenylsilsesquioxane skeleton were respectively observed at 10.9 ppm and 79.2 ppm at the intensity ratio of 2:8 and also the signal of the Si nuclei in the raw material 1,3-bis(3-methacryloyloxypropyl)-1,1,3,3-tetramethyldisiloxane which had not been removed by the precipitation procedure and remained in some quantity in said oligomer was observed at 7.7 ppm. The signals of the Si nuclei linked to hydroxyl groups, –70 ppm and –62 ppm, were not observed.

Synthetic Example 2

A solution of approximately 500 parts of phenyltrichlorosilane in 500 parts of toluene was gradually added to 2,000 parts by weight of water with stirring. The acid layer was separated and the resin layer in the form of a toluene solution was submitted to azeotropic distillation to remove the residual water and HCl. Thereafter, KOH corresponding to approximately 0.078% of the calculated amount of hydroxyl-free phenylpolysiloxane was added and the toluene solution was refluxed with stirring for 9 hours to give silanol-free ladder-type phenylpolysiloxane prepolymer. The phenylpolysiloxane prepolymer obtained as syrup accounted for approximately 50.3% of the toluene solution and its repeating unit was represented by $C_6H_5SiO_{1.5}$. The prepolymer was separated as a solid as follows. The toluene solution of this prepolymer was diluted with an approximately 1.5-fold amount of mineral spirit (boiling point, approximately 156–196° C.; KB value, approximately 37), the resulting slurry was agitated powerfully for approximately 10 minutes, filtered, and the solid separated was dried in air for approximately 16 hours and then at 150° C. for 4 hours.

In 50 parts by weight of toluene were dissolved 10 parts by weight of the prepolymer (Mw 4,000) prepared above and 50 parts by weight of 1,3-bis(3-methacryloyloxypropyl)-1,1,3,3-tetramethyldisiloxane, to the resulting solution were added 5 parts by weight of KOH and 0.05 part by weight of a polymerization inhibitor (Methoquinone, available from Seiko Chemical Co., Ltd.) and the mixture was heated with stirring at reflux temperature for 10 hours. The reaction mixture was cooled to room temperature, filtered to remove the insoluble unreacted KOH, and the filtrate was poured into 1,000 parts by weight of n-hexane to precipitate silylated polyphenylsilsesquioxane containing terminal methacryloyl groups. The precipitate was separated by filtration and dried in vacuum to give 12 parts by weight of ladder-type silylated polyphenylsilsesquioxane containing terminal methacryloyl groups (silicone resin L) as a white solid.

The Mw of silicone resin L was approximately 5,000. When the resin was analyzed by infrared spectrometry, absorption bands assignable to Si—$C_6H_5$ were observed at 1595 $cm^{-1}$ and 1430 $cm^{-1}$ and those assignable to the antisymmetric stretching vibration of Si—O—Si which indicates the presence of a ladder structure were observed at 1135 $cm^{-1}$ and 1045 $cm^{-1}$ while the absorption band assignable to Si—OH was not observed at 3400 $cm^{-1}$. The signals of the H nuclei in the 3-methacryloyloxypropyldimethylsilyl group and phenyl group were observed in a $^1$H-NMR measurement.

The structure of silicone resin C obtained in Synthetic Example 1 was mainly cage-type while that of silicone resin L obtained in Synthetic Example 2 was roughly 100% ladder-type.

Example 1

A transparent silicone resin composition was obtained by mixing 50 parts by weight of silicone resin C prepared in Synthetic Example 1 and 50 parts by weight of trimethylolpropane triacrylate.

The composition was cast to a thickness of 1.0 mm by the use of a roll coater and cured by irradiation with electron rays at a dose of 1 Mrad to give a molded product of silicone resin in sheet form. The properties of the molded product are shown in Table 1.

Examples 2–11

Transparent silicone resin compositions were obtained by mixing silicone resin C prepared in Synthetic Example 1, the unsaturated compound(s) and the polymerization initiator at the ratio shown in Table 1.

In Example 2, the composition was cast as in Example 1 and heated in a nitrogen atmosphere in an oven at 120° C. for 30 minutes to give a molded product of silicone resin in sheet form.

In Examples 3–11, the composition was cast as in Example 1 and cured at an integrated dose of 1,000 $mJ/cm^2$ by the use of a high-pressure mercury lamp (30 W/cm) to give a molded product of silicone resin in sheet form.

Comparative Examples 1–3

Silicone resin compositions were obtained by mixing silicone resin L prepared in Synthetic Example 2, the unsaturated compound and the polymerization initiator at the ratio shown in Table 1. In Comparative Examples 2 and 3, the components were not completely compatible with each other and transparent silicone resin compositions were not obtained.

Each composition was cast to a thickness of 1.0 mm by the use of a roll coater and cured at an integrated dose of 1,000 $mJ/cm^2$ by the use of a high-pressure mercury lamp (30 W/cm) to give a molded product of acrylic resin (Comparative Example 1) or silicone resin (Comparative Examples 2 and 3) in sheet form.

The properties of the molded products thus obtained are shown in Tables 2 and 3.

The abbreviations used in the tables are as follows.

TMPTA: Trimethylolpropane triacrylate
TFEMA: Trifluoroethyl methacrylate
TCDDA: Tricyclo[$5.2.1.0^{2,6}$]decane diacrylate (Light Acrylate DCP-A, available from Kyoeisha Chemical Co., Ltd.; a compound represented by general formula (3) in which Z is (3b) and R is H)
HCHPK: 1-Hydroxycyclohexyl phenyl ketone
BPOEH: t-butylperoxy-2-ethylhexanoate

TABLE 1

| | Silicone resin | | Unsaturated compound | | | Polymerization initiator | |
|---|---|---|---|---|---|---|---|
| | C | L | TMPTA | TFEMA | TCDDA | HCHPK | BPOEH |
| Example | | | | | | | |
| 1 | 50 | — | 50 | | | | |
| 2 | 50 | — | 50 | | | | 2 |
| 3 | 50 | — | 50 | | | 2 | |
| 4 | 20 | — | 80 | | | 2 | |
| 5 | 20 | — | | | 80 | 2 | |
| 6 | 50 | — | 20 | 30 | — | 2 | |
| 7 | 50 | — | 40 | | 10 | 2 | |
| 8 | 50 | — | 25 | | 25 | 2 | |
| 9 | 50 | — | 10 | | 40 | 2 | |
| 10 | 20 | — | 60 | | 20 | 2 | |
| 11 | 20 | — | 40 | | 40 | 2 | |
| 12 | 20 | — | 20 | | 60 | 2 | |
| Comparative example | | | | | | | |
| 1 | — | — | 100 | | — | 2 | |
| 2 | — | 50 | 50 | | — | 2 | |
| 3 | — | 50 | — | | 50 | 2 | |

TABLE 2

| Example | TS (Mpa) | E (%) | FM (Mpa) | Tg (° C.) | $Td^5$ (° C.) | TLT (%) | WA (%) |
|---|---|---|---|---|---|---|---|
| 1 | 56 | 9.8 | 2,320 | >400 | 420 | 90.4 | 0.8 |
| 2 | 55 | 9.2 | 2,400 | >400 | 420 | 91.0 | 0.8 |
| 3 | 56 | 9.5 | 2,350 | >400 | 420 | 90.6 | 0.8 |
| 4 | 60 | 5.0 | 2,800 | 385 | 405 | 92.0 | 1.2 |
| 5 | 58 | 4.0 | 2,750 | 362 | 383 | 91.8 | 0.5 |
| 6 | 50 | 9.5 | 2,140 | 337 | 355 | 91.5 | 0.2 |
| 12 | 53 | 11.4 | 2,700 | 368 | 388 | 91.9 | 0.7 |

TABLE 3

| | TS (Mpa) | E (%) | FM (Mpa) | Tg (° C.) | Td⁵ (° C.) | TLT (%) | WA (%) | MOD | TDF |
|---|---|---|---|---|---|---|---|---|---|
| Ex. | | | | | | | | | |
| 7 | 55 | 9.5 | 2300 | 386 | 417 | 90.5 | 0.7 | ○ | ○ |
| 8 | 55 | 9.8 | 2310 | 383 | 414 | 90.4 | 0.6 | ○ | ○ |
| 9 | 54 | 10.3 | 2280 | 379 | 409 | 90.4 | 0.4 | ○ | ○ |
| 10 | 60 | 6.8 | 2700 | 378 | 399 | 92.0 | 1.0 | ○ | ○ |
| 11 | 55 | 8.6 | 2710 | 372 | 396 | 91.9 | 0.9 | ○ | ○ |
| Comparative example | | | | | | | | | |
| 1 | 65 | 1.5 | 3,000 | 290 | 320 | 92.0 | 2.0 | X | Δ |
| 2 | 48 | 1.0 | 2,700 | 312 | 330 | 65.7 | 0.9 | ○ | Δ |
| 3 | 47 | 1.2 | 2,500 | 305 | 335 | 63.3 | 0.9 | ○ | X |

1) Tensile strength at break (TS) and tensile elongation at break (E): test rate, 5.0 mm/min; distance between specimen holding devices, 50 mm (reference specification JIS K 7162)
2) Flexural modulus (FM): test rate, 0.3 mm/min; distance between supports, 12 mm; radius of support, 0.5 mm; radius of indenting tool, 1.5 mm (reference specification JIS K 7171)
3) Glass transition temperature (Tg): determined by a dynamic thermomechanical analyzer (DMA); rate of temperature rise, 5° C./min; distance between specimen holding devices, 10 mm
4) 5% weight loss temperature (Td⁵): determined by a thermogravimetric analyzer (TGA) in a nitrogen atmosphere at a rate of temperature rise of 10° C./min
5) Total light transmission (TLT): thickness of specimen, 0.7 mm (reference specification JIS K 7361-1)
6) Water absorption (WA): The specimen was preliminarily dried at 50° C. for 24 hours. (reference specification JIS K 7209)
7) Moldability (MOD): A test resin composition was cured on the substrate under the conditions employed in the aforementioned examples to form a 2 mm-thick sheet (molded product) and the ease of removing the molded product from the substrate was evaluated as follows.
○: Removable with extreme ease
Δ: Normally removable without problem, fracture occurring approximately once in ten tries
X: Prone to fracture easily and removable with difficulty
8) Thermal deformation (TDF): A molded product (100×100 mm) with a thickness of 0.4 mm was placed in a hot-air circulating oven at 160° C. and the molded product was visually evaluated for the presence or absence of warpage and undulation.
○: Warpage or undulation not observed
Δ: Warpage observed
X: Undulation observed

We claim:

1. A silicone resin composition formulated from a silicone resin comprising mainly polyorganosilsesquioxane which is represented by formula (1)

$$[RSiO_{3/2}]_n \quad (1)$$

(wherein R is an alkyl group containing 1 to 6 carbon atoms or phenyl group) and contains a cage structure in us structural unit and the siloxy (SiO—) groups of which are at least partly linked to a triorganosilyl group represented by the following general formula (2)

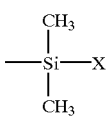

(wherein X is a reactive functional group represented by —R¹—OCO—CR²=CH₂, —R¹—CR²=CH₂ or —CH=CH₂; R¹ is an alkylene group, an alkylidene group or phenylene group; and R² is a hydrogen atom or an alkyl group)

and an unsaturated compound which contains at least one unsaturated group represented by —R³—CR⁴=CH₂ or —CR⁴=CH₂ (wherein R³ is an alkylene group, an alkylidene group or —OCO— group; and R⁴ is a hydrogen atom or an alkyl group) in the molecule and is radically copolymerizable with the silicone resin at a weight ratio of 1:99 to 99:1,
wherein 10 to 100 wt % of the unsaturated compound which is radically copolymerizable with the silicone resin is an alicyclic unsaturated compound represented by the following general formula (3)

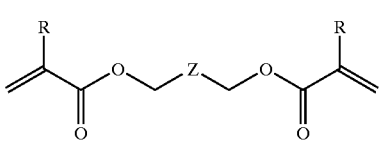

(wherein Z is (3a) or (3b) shown below; and R is a hydrogen atom or methyl group)

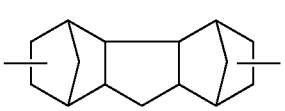

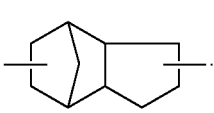

2. A silicone resin composition as described in claim 1 wherein said composition is formulated from the silicone resin, the alicyclic unsaturated compound and other unsaturated compounds at a weight ratio of (5–80):(10–50):(0–80).

3. A silicone resin composition as described in claim 1 wherein the unsaturated group is at least one kind selected from the group of acryloyl, methacryloyl, allyl and vinyl.

4. A silicone resin composition as described in claim 1 wherein the polyorganosilsesquioxane comprises at least one kind of structure selected from cage-structured polyorganosilsesquioxane and cage-terminated ladder-structured polyorganosilsesquioxane.

5. A silicone resin composition formulated from a silicone resin comprising mainly polyorganosilsesquioxane which is represented by formula (1)

  (1)

(wherein R is an alkyl group containing 1 to 6 carbon atoms or phenyl group) and contains a case structure in its structural unit and the siloxy (SiO—) groups of which are at least partly linked to a triorganosilyl group represented by the following general formula (2)

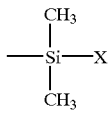  (2)

(wherein X is a reactive functional group represented by $-R^1-OCO-CR^2=CH_2$, $-R^1-CR^2=CH_2$ or $-CH=CH_2$; $R^1$ is an alkylene group, an alkylidene group or phenylene group; and $R^2$ is a hydrogen atom or an alkyl group)

and an unsaturated compound which contains at least one unsaturated group represented by $-R^3-CR^4=CH_2$ or $-Chu4=CH_2$ (wherein $R^3$ is an alkylene group, an alkylidene group or —OCO— group; and $R^4$ is a hydrogen atom or an alkyl group) in the molecule and is radically copolymerizable with the silicone resin at a weight ratio of 1:99 to 99:1.

wherein the polyorganosilsesquioxane has a mixed structure comprising a ladder-structured polyorganosilsesquioxane in the range of greater than 0 wt %, but less than 50 wt %.

6. A silicone resin composition formulated from a silicone resin comprising mainly polyorganosilsesquioxane which is represented by formula (1)

  (1)

(wherein R is an alkyl group containing 1 to 6 carbon atoms or phenyl group) and contains a cage structure in its structural unit and the siloxy (SiO—) groups of which are at least partly linked to a triorganosilyl group represented by the following general formula (2)

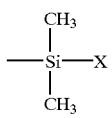  (2)

(wherein X is a reactive functional group represented by $-R^1-OCO-CR^2=CH_2$, $-R^1-CR^2=CH_2$ or $-CH=CH_2$; $R^1$ is an alkylene group, an alkylidene group or phenylene group; and $R^2$ is a hydrogen atom or an alkyl group)

and an unsaturated compound which contains at least one unsaturated group represented by $-R^3-CR^4=CH_2$ or $-CR^4=CH_2$ (wherein $R^3$ is an alkylene group, an alkylidene group or —OCO— group; and $R^4$ is a hydrogen atom or an alkyl group) in the molecule and is radically copolymerizable with the silicone resin at a weight ratio of 1:99 to 99:1 wherein the silicone resin is the reaction product prepared by heating to equilibrium a cage-structured polyorganosilsesquioxane which is cage-terminated and silanol-free and a disiloxane which contains reactive functional groups represented by the following general formula (4)

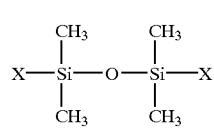  (4)

(wherein X is the same as defined in the aforementioned general formula (1)) in an organic solvent in the presence of an alkaline rearrangement and condensation catalyst and contains 1.1 or more reactive functional groups X on the average in the molecule.

7. A silicone resin composition as described in claim 1 wherein the unsaturated compound contains monomers or oligomers having 2 to 5 unsaturated groups in each of their molecules and contains 1.1 or more unsaturated groups on the average in the molecule.

8. A process for preparing a silicone resin copolymer which comprises radically copolymerizing the silicone resin composition described in claim 1 by heating or irradiating with energetic radiation.

9. A silicone resin copolymer prepared by radically copolymerizing the silicone resin composition described in claim 1.

10. A silicone resin copolymer prepared by radically copolymerizing a silicone resin composition formulated from a silicone resin comprising mainly polyorganosilsesquioxane which is represented by formula (1)

  (1)

(wherein R is an alkyl group containing 1 to 6 carbon atoms or phenyl group) and contains a cane structure in its structural unit and the siloxy (SiO—) groups of which are at least partly linked to a triorganosilyl group represented by the following general formula (2)

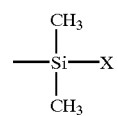  (2)

(wherein X is a reactive functional group represented by $-R^1-OCO-CR^2=CH_2$, $-R^1-CR^2=CH_2$ or $-CH=CH_2$; $R^1$ is an alkylene group, an alkylidene group or phenylene group; and $R^2$ is a hydrogen atom or an alkyl group)

and an unsaturated compound which contains at least one unsaturated group represented by $-R^3-CR^4=CH_2$ or —$CR^4$=$CH_2$ (wherein $R^3$ is an alkylene group, an alkylidene group or —OCO— group; and $R^4$ is a hydrogen atom or an alkyl group) in the molecule and is radically copolymerizable with the silicone resin at a weight ratio of 1:99 to 99:1 wherein said silicone resin copolymer exhibits a glass transition temperature of 300° C. or above, a 5% weight loss temperature of 300° C. or above, a total light transmission of 85% or more and a water absorption of 1.5% or less.

11. A molded product obtained by molding the silicone resin composition described in of claim 1 followed by curing.

12. A molded product from the silicone resin copolymer described in claim 9.

13. A molded product from the silicone resin copolymer described in claim 10.

* * * * *